(12) United States Patent
Li et al.

(10) Patent No.: US 12,101,429 B2
(45) Date of Patent: Sep. 24, 2024

(54) METHOD FOR SERVICE DECISION DISTRIBUTION AMONG MULTIPLE TERMINAL DEVICES AND SYSTEM

(71) Applicant: Huawei Technologies Co., Ltd., Shenzhen (CN)

(72) Inventors: Ronggen Li, Nanjing (CN); Fengkai Liu, Nanjing (CN); Chundong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 492 days.

(21) Appl. No.: 17/432,843

(22) PCT Filed: Feb. 19, 2020

(86) PCT No.: PCT/CN2020/075783
§ 371 (c)(1),
(2) Date: Aug. 20, 2021

(87) PCT Pub. No.: WO2020/173345
PCT Pub. Date: Sep. 3, 2020

(65) Prior Publication Data
US 2022/0150348 A1    May 12, 2022

(30) Foreign Application Priority Data

Feb. 25, 2019  (CN) .......................... 201910138908.1

(51) Int. Cl.
*H04M 1/72454* (2021.01)
*H04M 1/72409* (2021.01)
(Continued)

(52) U.S. Cl.
CPC . *H04M 1/72454* (2021.01); *H04M 1/724095* (2022.02); *H04W 4/029* (2018.02); *H04W 4/50* (2018.02); *H04W 8/18* (2013.01)

(58) Field of Classification Search
CPC ....... H04M 1/72454; H04M 1/724095; H04W 4/029; H04W 4/50; H04W 8/18; H04L 67/62; H04L 67/06
See application file for complete search history.

(56) References Cited

U.S. PATENT DOCUMENTS

2012/0295572 A1    11/2012  Park
2014/0235258 A1*   8/2014  Chen ...................... H04W 4/60
                                                   455/452.1
(Continued)

FOREIGN PATENT DOCUMENTS

CN      102833324 A      12/2012
CN      104038660 A       9/2014
(Continued)

*Primary Examiner* — Mazda Sabouri
(74) *Attorney, Agent, or Firm* — Conley Rose, P.C.

(57) ABSTRACT

A method for service decision distribution includes obtaining, by a service distribution system, service data associated with a target service is triggered, where the service data includes service type information and user information, obtaining, by the service distribution system during a determining period of the target service, device capability information and device status information of a plurality of terminal devices associated with the user information, determining, by the service distribution system based on the service type information, the device capability information, and the device status information of the terminal devices, a target terminal device that is in the terminal devices and that is used to execute the target service or a target moment for executing the target service to implement service transfer among multiple terminal devices.

19 Claims, 6 Drawing Sheets

(51) Int. Cl.
*H04W 4/029* (2018.01)
*H04W 4/50* (2018.01)
*H04W 8/18* (2009.01)

(56) References Cited

U.S. PATENT DOCUMENTS

| | | | |
|---|---|---|---|
| 2014/0253939 A1 | 9/2014 | Hashimoto | |
| 2014/0359499 A1* | 12/2014 | Cho | G06F 8/38 |
| | | | 715/765 |
| 2016/0119262 A1* | 4/2016 | Siegel | H04L 12/1859 |
| | | | 709/206 |
| 2016/0313801 A1 | 10/2016 | Wagner et al. | |
| 2016/0321325 A1 | 11/2016 | Wang et al. | |
| 2016/0359689 A1 | 12/2016 | Herreria et al. | |
| 2017/0140285 A1* | 5/2017 | Dotan-Cohen | G06F 9/453 |
| 2018/0146052 A1 | 5/2018 | Tsunoda et al. | |
| 2018/0176727 A1* | 6/2018 | Williams | A61B 5/6802 |
| 2019/0341048 A1 | 11/2019 | Cheng et al. | |

FOREIGN PATENT DOCUMENTS

| | | |
|---|---|---|
| CN | 104363569 A | 2/2015 |
| CN | 104852842 A | 8/2015 |
| CN | 105376414 A | 3/2016 |
| CN | 105959486 A | 9/2016 |
| CN | 106453919 A | 2/2017 |
| CN | 106790523 A | 5/2017 |
| CN | 107087255 A | 8/2017 |
| CN | 107408009 A | 11/2017 |
| CN | 108683735 A | 10/2018 |
| CN | 108766423 A | 11/2018 |
| CN | 109377987 A | 2/2019 |
| CN | 109660675 A | 4/2019 |
| KR | 20130082941 A | 7/2013 |
| WO | 2017162928 A1 | 9/2017 |

\* cited by examiner

METHOD FOR SERVICE DECISION DISTRIBUTION AMONG MULTIPLE TERMINAL DEVICES AND SYSTEM

CROSS-REFERENCE TO RELATED APPLICATIONS

This application is a U.S. National Stage of International Patent Application No. PCT/CN2020/075783 filed on Feb. 19, 2020, which claims priority to Chinese Patent Application No. 201910138908.1 filed on Feb. 25, 2019. Both of the aforementioned applications are hereby incorporated by reference in their entireties.

TECHNICAL FIELD

The present invention relates to the field of internet of things control, and in particular, to a method for service decision distribution among multiple terminal devices and a system.

BACKGROUND

With technological advancement and popularization of intelligent devices, a user cannot live without convenient operations brought by the intelligent devices. These intelligent devices can provide convenient point-to-point services for the user. For example, the user can control various household statuses by using a mobile phone anytime anywhere. Still further, some devices can be developed through customized technologies to implement automatic control of a device status in a specific state, thereby reflecting specified intelligent interaction. However, these devices cannot communicate with each other due to hardware, system (protocol), and manufacturer differences. When the user attempts to obtain data from another device by using one device, the user finds it difficult to obtain the data.

Currently, the industry has its own solution to inter-device interworking. Generally, there is a control system that is responsible for managing links to all smart households, monitoring a device status, and performing point-to-point control. Controllable content focuses on capabilities of devices, that is, an entire system can control the devices to do a single thing, and the system integrates these capabilities and controls the devices by using a control instruction based on a user requirement, to implement automatic control of the devices.

It may be learned from the above that, in the conventional technology, device-centric is more common, and there is a specific correspondence between a service and a device, but there is no solution for service transfer among multiple terminal devices.

SUMMARY

Embodiments of the present invention provide a method for service decision distribution among multiple terminal devices and a system, to implement service transfer among multiple terminal devices.

According to a first aspect, a method for service decision distribution among multiple terminal devices is provided. A service distribution system obtains service data generated after a target service is triggered, where the service data includes service type information and user information; the service distribution system obtains, in a determining period of the target service, device capability information and device status information of a plurality of terminal devices associated with the user information; and the service distribution system determines, based on the service type information, and the device capability information and the device status information of the plurality of terminal devices, a target terminal device that is in the plurality of terminal devices and that is used to execute the target service and/or a target moment for executing the target service.

In this embodiment of the present invention, the service distribution system first obtains the service data generated after the target service is triggered, where the service data includes the service type information and the user information, obtains, in the determining period of the target service, the device capability information and the device status information of the plurality of terminal devices associated with the user information, and then determines, based on the service type information, and the device capability information and the device status information of the plurality of terminal devices, the target terminal device that is in the plurality of terminal devices and that is used to execute the target service and/or the target moment for executing the target service. It may be learned from the above that, the service distribution system performs unified scheduling management on a service, and determines, based on a service context of the target service and device contexts of the plurality of terminal devices associated with a user of the target service, the target terminal device that is in the plurality of terminal devices and that is used to execute the target service and/or the target moment for executing the target service. In this way, an execution device and an execution occasion of the target service are both flexible and changeable, thereby implementing service transfer among multiple terminal devices.

In a possible implementation, the service data further includes application information of an application that provides the target service. The service distribution system obtains, based on the application information, a rule file matching the application information; and the service distribution system determines, based on the service type information, and the device capability information and the device status information of the plurality of terminal devices and by using the rule file and/or a decision model pre-trained by using the rule file, the target terminal device that is in the plurality of terminal devices and that is used to execute the target service and/or the target moment for executing the target service. According to this implementation, each application may have a specific rule file, so that an execution device and/or an execution occasion matching the application can be determined based on the rule file and/or the decision model pre-trained by using the rule file.

In a possible implementation, a service type indicated by the service type information includes any one of the following types: a life service of a user, a service triggered in a scheduled manner, a real-time notification service, and a communication service.

In a possible implementation, a device capability indicated by the device capability information includes at least one of the following capabilities: an audio output capability, a video output capability, and a communication capability.

In a possible implementation, a device status indicated by the device status information includes at least one of the following statuses: an on or off state, a geographical location state, and a motion state.

Further, the decision model is a machine learning model established based on a random forest algorithm, and a random forest in the random forest algorithm includes a plurality of decision trees.

In a possible implementation, a service type indicated by the service type information is a service triggered in a scheduled manner. The plurality of terminal devices include a television and a mobile phone; an on or off state of the television indicates that the television is in an on state; and a geographical location state of the mobile phone indicates that the mobile phone is at home. The service distribution system determines, based on the case in which a service type is a service triggered in a scheduled manner, the television is in an on state, and the mobile phone is at home, that the target terminal device that is in the plurality of terminal devices and that is used to execute the target service is the television. According to this implementation, if the service type is a service triggered in a scheduled manner, it may be determined, based on the geographical location state of the mobile phone and the on state of the television, that the television executes the service triggered in a scheduled manner. In comparison with a manner in which the mobile phone usually executes the service triggered in a scheduled manner, user experience can be improved.

In a possible implementation, a service type indicated by the service type information is a real-time notification service. The plurality of terminal devices include a mobile phone and a watch; a motion state of the watch indicates a user to raise an arm to observe the watch; and a geographical location state of the mobile phone indicates that the mobile phone is at a waiting location of the target service. The service distribution system determines, based on the case in which a service type is a real-time notification service, a motion state of the watch indicates a user to raise an arm to observe the watch, and a geographical location state of the mobile phone indicates that the mobile phone is at a waiting location of the target service, that the target terminal device that is in the plurality of terminal devices and that is used to execute the target service is the watch. According to this implementation, if the service type is a real-time notification service, it may be determined, based on the geographical location state of the mobile phone and the motion state of the watch, that the watch executes the real-time notification service. In comparison with a manner in which the mobile phone usually executes the real-time notification service, user experience can be improved.

In a possible implementation, a service type indicated by the service type information is a real-time notification service. The plurality of terminal devices include a mobile phone and a watch; a motion state of the watch indicates a user to raise an arm to observe the watch; and a geographical location state of the mobile phone indicates that the mobile phone is at a waiting location of the target service. The service distribution system determines, based on the case in which a service type is a real-time notification service, a motion state of the watch indicates a user to raise an arm to observe the watch, and a geographical location state of the mobile phone indicates that the mobile phone is at a waiting location of the target service, to execute the target service at a current moment. According to this implementation, if the service type is a real-time notification service, it may be determined, based on the geographical location state of the mobile phone and the motion state of the watch, to execute the real-time notification service at the current moment. In comparison with a manner in which the real-time notification service is usually executed only once, user experience can be improved.

According to a second aspect, an embodiment of the present invention provides a service distribution system. The service distribution system may implement a function executed in the method design in the first aspect. The function may be implemented by hardware, or may be implemented by hardware executing corresponding software. The hardware or the software includes one or more modules corresponding to the foregoing function.

In a possible design, a structure of the service distribution system includes a processor, and the processor is configured to support the service distribution system in executing a corresponding function in the method in the first aspect. The service distribution system may further include a memory. The memory is configured to be coupled to the processor, and stores program instructions and data that are necessary for the service distribution system. The service distribution system may further include a communications interface. The communications interface is configured to send or receive information, transmit audio and video data, and the like.

According to a third aspect, an embodiment of the present invention provides a communications apparatus. The communications apparatus may be, for example, a chip, the communications apparatus may be disposed in a service distribution system, and the communications apparatus includes a processor and an interface. The processor is configured to support the communications apparatus in executing a corresponding function in the method in the first aspect. The interface is configured to support communication between the communications apparatus and another communications apparatus or another network element. The communications apparatus may further include a memory. The memory is configured to be coupled to the processor, and stores program instructions and data that are necessary for the communications apparatus.

According to a fourth aspect, an embodiment of the present invention provides a computer storage medium, and the computer storage medium stores instructions. When the instructions are run on a computer, the computer is enabled to perform the method according to any one of the first aspect and the possible designs of the first aspect.

According to a fifth aspect, an embodiment of the present invention provides a computer program product including instructions. When the program is executed by a computer, the instructions enable the computer to perform the method according to any one of the first aspect and the possible designs of the first aspect.

According to a sixth aspect, an embodiment of the present invention provides a computer program including instructions. When the program is executed by a computer, the instructions enable the computer to perform the method according to any one of the first aspect and the possible designs of the first aspect.

In the embodiments of the present invention, the service distribution system first obtains the service data generated after the target service is triggered, where the service data includes the service type information and the user information, obtains, in the determining period of the target service, the device capability information and the device status information of the plurality of terminal devices associated with the user information, and then determines, based on the service type information, and the device capability information and the device status information of the plurality of terminal devices, the target terminal device that is in the plurality of terminal devices and that is used to execute the target service and/or the target moment for executing the target service. It may be learned from the above that, the service distribution system performs unified scheduling management on a service, and determines, based on a service context of the target service and device contexts of the plurality of terminal devices associated with a user of the target service, the target terminal device that is in the plurality of terminal devices and that is used to execute the target service and/or the target moment for executing the target service. In this way, an execution device and an execution occasion of the target service are both flexible and changeable, thereby implementing service transfer among multiple terminal devices.

DESCRIPTION OF EMBODIMENTS

Figure 1:
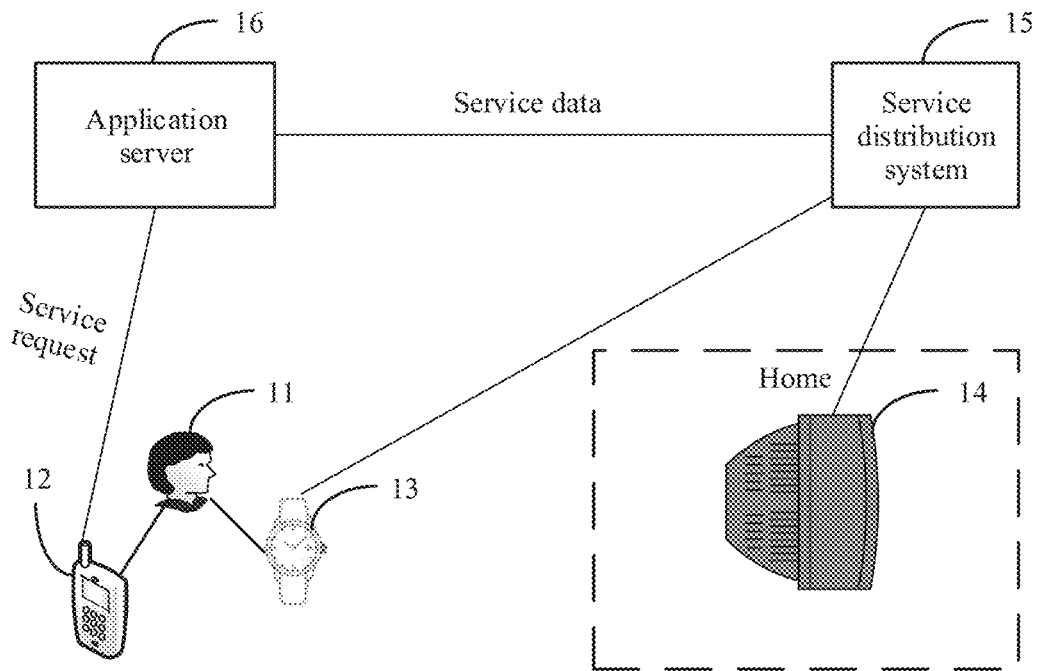
FIG. 1 is a schematic diagram of an application scenario of a method for service decision distribution among multiple terminal devices according to an embodiment of the present invention.

FIG. 1 is a schematic diagram of an application scenario of a method for service decision distribution among multiple terminal devices according to an embodiment of the present invention. Referring to FIG. 1, a user 11 has a plurality of terminal devices, including a mobile phone 12, a watch 13, and a television 14, and registers the plurality of terminal devices with a service distribution system 15 in advance, so that the service distribution system 15 records a correspondence between the user 11 and the plurality of terminal devices. When the user 11 requests a service from an application server 16 by using the mobile phone 12, the application server 16 generates service data of the service, where the service data includes service type information and user information; and sends the service data of the service to the service distribution system 15. The service distribution system 15 determines, based on the user information in the service data, that a request party of the service is the user 11, and queries a registration record to learn that the plurality of terminal devices registered by the user 11 include the mobile phone 12, the watch 13, and the television 14. The service distribution system 15 obtains device capability information and device status information of the mobile phone 12, the watch 13, and the television 14, and determines, based on the service type information, and the device capability information and the device status information of the plurality of terminal devices, a target terminal device that is in the plurality of terminal devices and that is used to execute a target service and/or a target moment for executing the target service.

It may be understood that the finally determined target terminal device may be one terminal device. For example, the service distribution system 15 determines to execute a service triggered in a scheduled manner by using the mobile phone 12. For another example, the service distribution system 15 determines to execute a service triggered in a scheduled manner by using the watch 13. For another example, the service distribution system 15 determines to execute a service triggered in a scheduled manner by using the television 14.

It may be understood that the finally determined target terminal device may be a plurality of terminal devices. For example, the service distribution system 15 determines to execute a service triggered in a scheduled manner separately by using the mobile phone 12 and the television 14. For another example, the service distribution system 15 determines to execute a service triggered in a scheduled manner separately by using the watch 13 and the television 14.

It may be understood that the finally determined target moment may be one moment. For example, the service distribution system 15 determines to execute a life service at a first moment by using the television 14, and the life service may be a broadcast of a weather forecast.

It may be understood that the finally determined target moment may be a plurality of moments. For example, the service distribution system 15 determines to execute a real-time notification service at a first moment by using the mobile phone 12. For another example, the service distribution system 15 determines, at a second moment, to execute the real-time notification service again by using the watch 13.

It should be noted that, in this embodiment of the present invention, a plurality of service types may be covered, and may include but are not limited to: a life service of a user, a service triggered in a scheduled manner, a real-time notification service, and a communication service.

In addition, a meaning of the terminal device is not limited to the foregoing mentioned mobile phone, television, and watch, but may include any terminal device with a communication capability, which is not listed one by one herein. In addition to the communication capability, the terminal device may have an audio output capability, a video output capability, a positioning capability, and the like.

In this embodiment of the present invention, a device status indicated by the device status information includes at least one of the following statuses: an on or off state, a geographical location state, a motion state, and the like.

Figure 2:
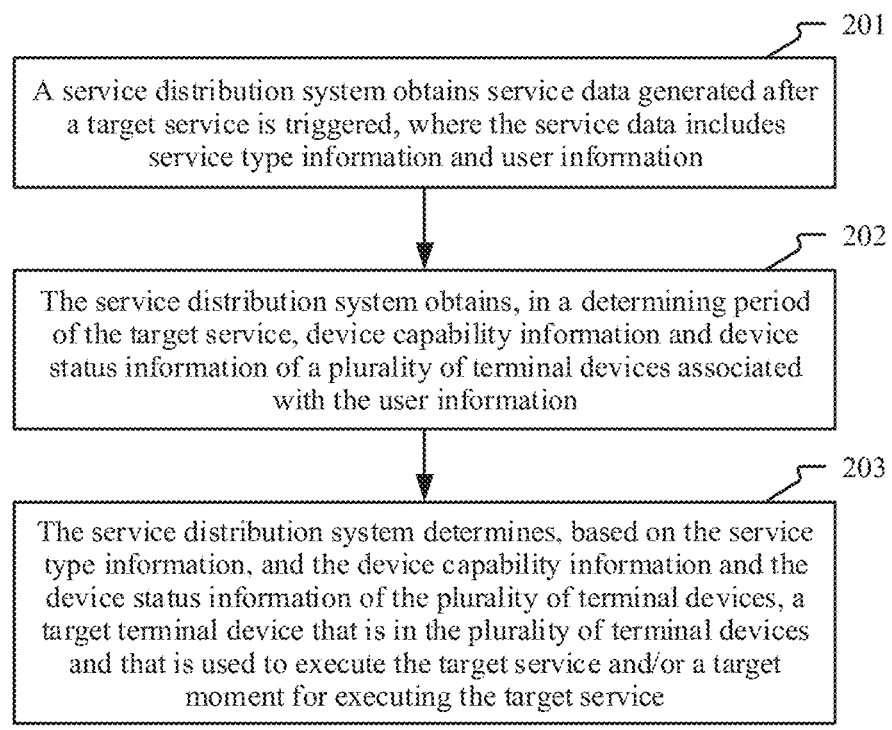
FIG. 2 is a schematic flowchart of a method for service decision distribution among multiple terminal devices according to an embodiment of the present invention.

FIG. 2 is a schematic flowchart of a method for service decision distribution among multiple terminal devices according to an embodiment of the present invention. This embodiment may be based on the application scenario shown in FIG. 1. The method includes: Step 201: A service distribution system obtains service data generated after a target service is triggered, where the service data includes service type information and user information. Step 202: The service distribution system obtains, in a determining period of the target service, device capability information and device status information of a plurality of terminal devices associated with the user information. Step 203: The service distribution system determines, based on the service type information, and the device capability information and the device status information of the plurality of terminal devices, a target terminal device that is in the plurality of terminal devices and that is used to execute the target service and/or a target moment for executing the target service. The following describes specific execution manners of the foregoing steps.

First, in step 201, the service distribution system obtains the service data generated after the target service is triggered, where the service data includes the service type information and the user information. The service type information is used to identify a service type of the target service, and the service type possibly includes a life service of a user, a service triggered in a scheduled manner, a real-time notification service, and a communication service. The life service of the user may include but is not limited to a weather forecast broadcast service, a real-time road condition information delivery service, and the like. The user information is used to identify a user identity, and may include but is not limited to an identity card number of the user, a mobile phone number of the user, a WeChat number of the user, and the like.

In an example, the service data further includes application information of an application that provides the target service. The application information corresponds to a matched rule file, and the rule file is used to determine an execution device and/or an execution moment of the target service.

Then, in step 202, the service distribution system obtains, in the determining period of the target service, the device capability information and the device status information of the plurality of terminal devices associated with the user information. A device capability indicated by the device capability information may include but is not limited to at least one of the following capabilities: an audio output capability, a video output capability, and a communication capability. A device status indicated by the device status information may include but is not limited to at least one of the following statuses: an on or oil state, a geographical location state, and a motion state.

It may be understood that the geographical location state may have only two status values. For example, one status value is used to indicate that the user is at home, and the other status value is used to indicate that the user is not at home. The geographical location state may alternatively have more than two status values. For example, one status value is used to indicate that the user is at home, another status value is used to indicate the user at an office, and still another status value is used to indicate that the user is at a waiting location of a waiting room.

The motion state may be used to reflect a current action of the user, for example, an action of the user raising a wrist to look at a watch, or an action of the user picking up or putting down a mobile phone.

Finally, in step 203, the service distribution system determines, based on the service type information, and the device capability information and the device status information of the plurality of terminal devices, the target terminal device that is in the plurality of terminal devices and that is used to execute the target service and/or the target moment for executing the target service.

In an example, a general rule file is prestored in the service distribution system. The service distribution system determines, based on the service type information, and the device capability information and the device status information of the plurality of terminal devices and by using the rule file and/or a decision model pre-trained by using the rule file, the target terminal device that is in the plurality of terminal devices and that is used to execute the target service and/or the target moment for executing the target service.

In another example, the service data further includes application information of an application that provides the target service, and each piece of application information corresponds to a matched rule file. The service distribution system obtains, based on the application information, a rule file matching the application information and the service distribution system determines, based on the service type information, and the device capability information and the device status information of the plurality of terminal devices and by using the rule file and/or a decision model pre-trained by using the rule file, the target terminal device that is in the plurality of terminal devices and that is used to execute the target service and/or the target moment for executing the target service.

Optionally, the decision model is a machine learning model established based on a random forest algorithm, and a random forest in the random forest algorithm includes a plurality of decision trees.

In an example, a service type indicated by the service type information is a service triggered in a scheduled manner. The plurality of terminal devices include a television and a mobile phone; an on or off state of the television indicates that the television is in an on state; and a geographical location state of the mobile phone indicates that the mobile phone is at home. The service distribution system determines, based on the case in which a service type is a service triggered in a scheduled manner, the television is in an on state, and the mobile phone is at home, that the target terminal device that is in the plurality of terminal devices and that is used to execute the target service is the television.

In another example, a service type indicated by the service type information is a real-time notification service. The plurality of terminal devices include a mobile phone and a watch; a motion state of the watch indicates a user to raise an arm to observe the watch; and a geographical location state of the mobile phone indicates that the mobile phone is at a waiting location of the target service. The service distribution system determines, based on the case in which a service type is a real-time notification service, a motion state of the watch indicates a user to raise an arm to observe the watch, and a geographical location state of the mobile phone indicates that the mobile phone is at a waiting location of the target service, that the target terminal device that is in the plurality of terminal devices and that is used to execute the target service is the watch.

In another example, a service type indicated by the service type information is a real-time notification service. The plurality of terminal devices include a mobile phone and a watch; a motion state of the watch indicates a user to raise an arm to observe the watch; and a geographical location state of the mobile phone indicates that the mobile phone is at a waiting location of the target service. The service distribution system determines, based on the case in which a service type is a real-time notification service, a motion state of the watch indicates a user to raise an arm to observe the watch, and a geographical location state of the mobile phone indicates that the mobile phone is at a waiting location of the target service, to execute the target service at a current moment.

In this embodiment of the present invention, the service distribution system first obtains the service data generated after the target service is triggered, where the service data includes the service type information and the user information, obtains, in the determining period of the target service, the device capability information and the device status information of the plurality of terminal devices associated with the user information, and then determines, based on the service type information, and the device capability information and the device status information of the plurality of terminal devices, the target terminal device that is in the plurality of terminal devices and that is used to execute the target service and/or the target moment for executing the target service. It may be learned from the above that, the service distribution system performs unified scheduling management on a service, and determines, based on a service context of the target service and device contexts of the plurality of terminal devices associated with a user of the target service, the target terminal device that is in the plurality of terminal devices and that is used to execute the target service and/or the target moment for executing the target service. In this way, an execution device and an execution occasion of the target service are both flexible and changeable, thereby implementing service transfer among multiple terminal devices.

Figure 3:
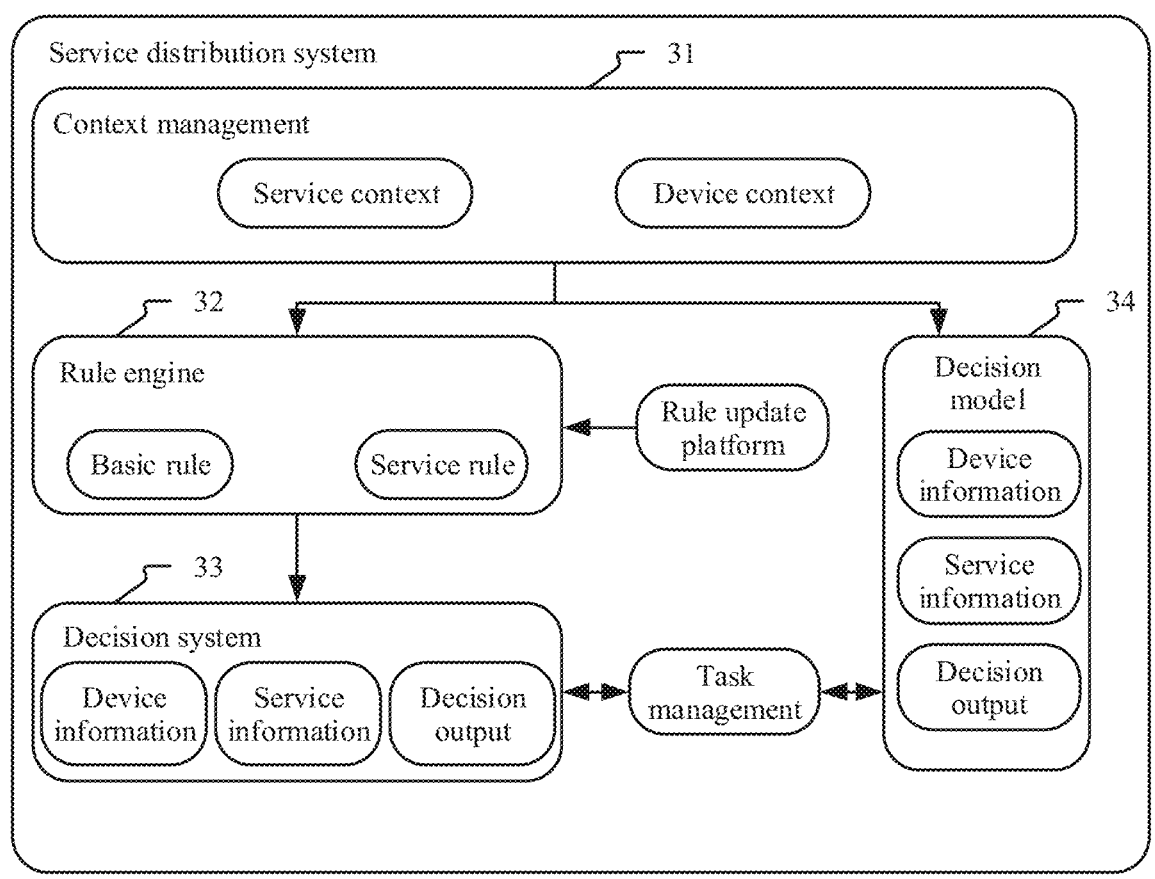
FIG. 3 is a schematic structural diagram of a service distribution system according to an embodiment of the present invention.

FIG. 3 is a schematic structural diagram of a service distribution system according to an embodiment of the present invention. The service distribution system may be configured to execute the method for service decision distribution among multiple terminal devices shown in FIG. 2, and includes the following several modules: a context management module 31, a rule engine module 32, a decision system module 33, and a decision model module 34.

The context management module 31 is configured to: record and manage cache (cache) information of a historically processed service and cache information of a device, and efficiently obtain some static information to provide data for decision-making.

The rule engine module 32 is configured to manage a rule, for example, define an editing specification and a format of the rule, read and parse the rule, and add, update, and delete the rule. An editing syntax of a service rule is open to three parties (a decision maker, a service provider, and a user), and a standard application programming interface (application programming interface, API) for obtaining device information and a device status is provided. The three parties may customize a rule for service transfer between devices based on a device status API.

The decision system module 33 is configured to output a decision result based on service data and device data according to a rule.

The decision model module 34 is configured to output the decision result based on the service data and the device data according to a model.

The service distribution system may further include a rule update platform module, and the rule update platform module is a background rule operating platform, and may dynamically change a rule based on a service requirement. Management is performed at a version granularity, and a decision system is notified, through pushing, to update the rule.

Because the decision result may be a scheduled task, another monitoring task, or the like, the task management module may perform centralized management and control through task management.

The rule engine module 32 and the decision system module 33 may be used as a group of modules to output the decision result, and the rule engine module 32 is a service logic parser. The rule engine module 32 may complete service logic parsing in combination with a rule editor and a rule profile. A database-based information system is fundamentally data processing. Therefore, operations at a service logic layer are operations such as computing and storing data input from an interface. The rule engine module 32 defines, through an object library, to-be-processed data transmitted to a rule, and defines, through a rule markup language, logic for processing the data and stores the logic in the rule profile. An external program needs to use a rule engine to parse and execute service logic in the rule profile.

The decision model module 34 may be used as another group of modules to output the decision result, and a decision model may be a machine learning model established based on a random forest algorithm. A random forest includes a plurality of decision trees. When data enters the random forest, the system determines a type of data based on each decision tree. Finally, in all decision trees, the one with most classification results is determined as a final result by combining a weight. This model is relatively suitable for a use scenario of the present invention, that is, some dimensions of sample data have a specified logical relationship, and the logical relationship may be reflected in decision-making of a decision tree.

In this embodiment of the present invention, the rule update platform manages addition, deletion, and modification of a rule for service distribution between devices, and the decision system module determines, based on service content, a service status, a device status, and a device capability by using an existing rule, how to present a service on a specified device; and determines, based on the service content, the service status, the device status, and the device capability by using a decision model generated through machine learning, how to present a service on a specified device. When the service distribution system knows an action being performed by a user and a capability and a status of a surrounding device of the user, a life service of the user, a service triggered in a scheduled manner, a real-time notification service, a communication service, and the like can be more efficiently presented between devices as a status (a location, an action, or the like) of the user changes.

Figure 4:
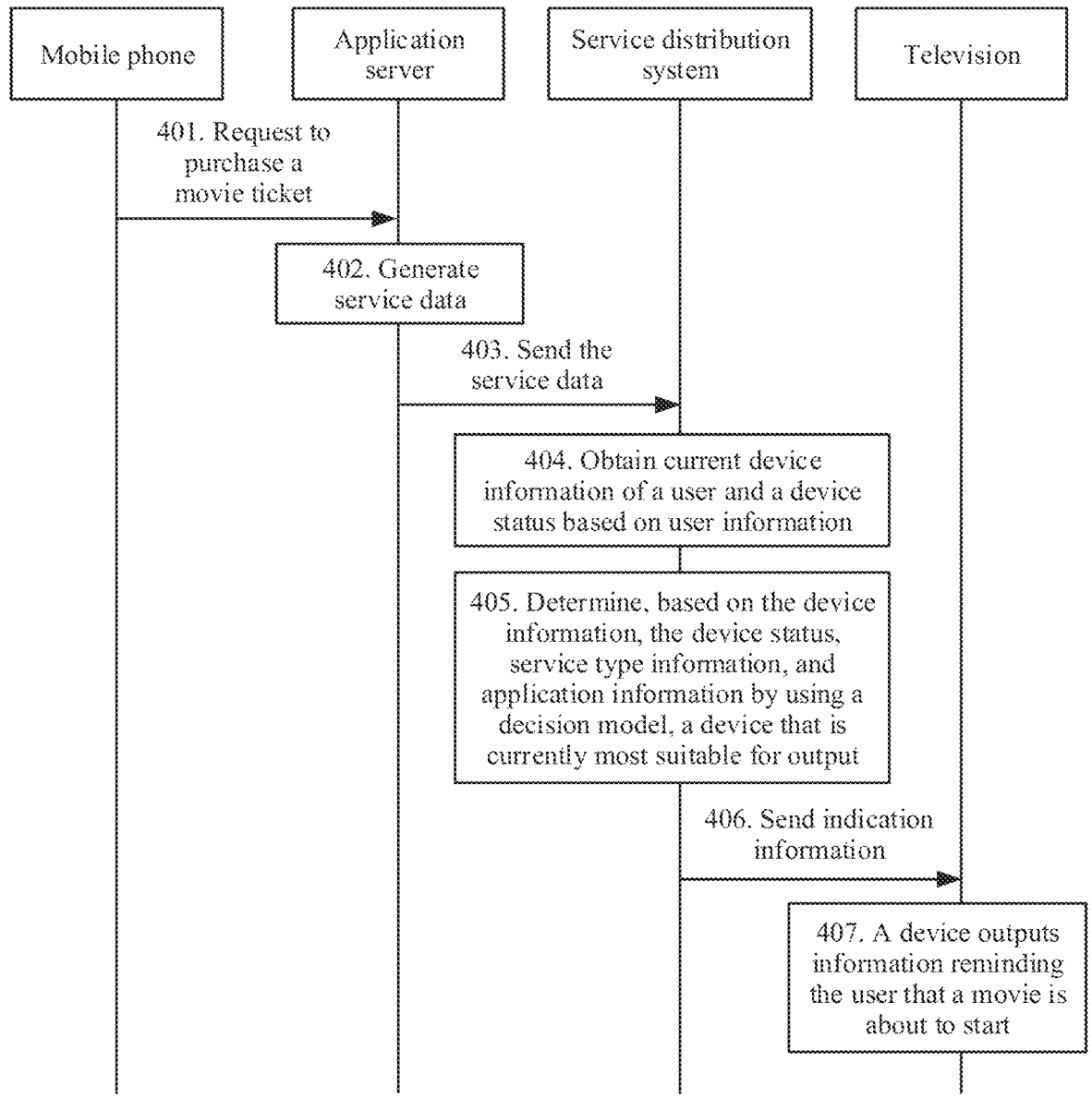
FIG. 4 is a schematic flowchart of another method for service decision distribution among multiple terminal devices according to an embodiment of the present invention.

FIG. 4 is a schematic flowchart of another method for service decision distribution among multiple terminal devices according to an embodiment of the present invention. This embodiment may be based on the application scenario shown in FIG. 1, a plurality of terminal devices associated with a user include a mobile phone and a television, a service type of a target service is a service triggered in a scheduled manner, and the method includes the following steps.

Step 401: A user requests to purchase a movie ticket from an application server by using a mobile phone.

Step 402: The application server generates one piece of service data.

The service data may include service type information, application information, and user information.

Step 403: The application server sends the service data to a service distribution system.

Step 404: The service distribution system obtains current device information of the user and a device status based on the user information.

Step 405: The service distribution system determines, based on the device information, the device status, the service type information, and the application information by using a decision model, a device that is currently most suitable for output.

For example, it is determined that the device that is currently most suitable for output is a television.

Step 406: The service distribution system sends indication information to the determined device, where the indication information is used to indicate the device to output information reminding the user that a movie is about to start.

Step 407: The device outputs the information reminding the user that the movie is about to start.

In this embodiment of the present invention, after the user purchases the movie ticket, the system generates a scheduled reminder task one hour ahead of schedule. When time is up, the system inputs parameters such as a television status, a user status, and a scheduled reminder into the decision model, and determines, from the model, that an output device of the reminder should be the television. Then, the television pops up the reminder indicating that the movie is about to start. That is, it is determined, based on a current status of the device (the television is playing, or a geographical location of the mobile phone is at home), a state that the user is watching television at home. For example, if the user purchases a movie ticket at 2:00 p.m., if the user is still watching television at 1:00 p.m., the reminder indicating that the movie is about to start is popped up on the television. It may be learned from the above that, the user can be intelligently reminded, based on information such as a geographical location of the user, that the movie is about to start. The user only needs to purchase the movie ticket, and the system entirely triggers the subsequent reminder. Regardless of the location of the user, the system always finds a nearest device to remind the user. However, because a conventional mobile phone is used to send a reminder by using a message, the user is prone to miss the reminder as long as the mobile phone is not around.

Figure 5:
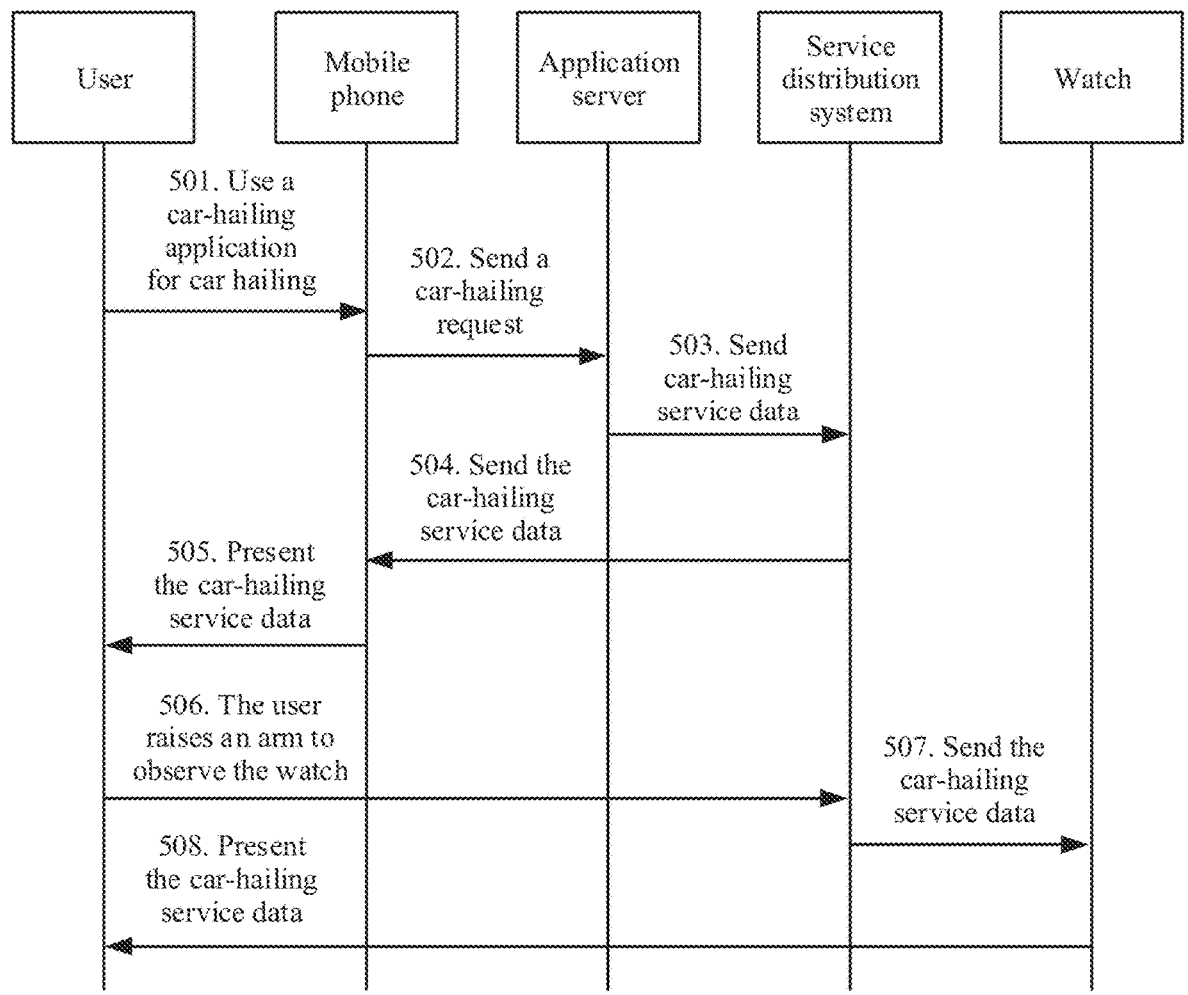
FIG. 5 is a schematic flowchart of another method for service decision distribution among multiple terminal devices according to an embodiment of the present invention.

FIG. 5 is a schematic flowchart of another method for service decision distribution among multiple terminal devices according to an embodiment of the present invention. This embodiment may be based on the application scenario shown in FIG. 1, a plurality of terminal devices associated with a user include a mobile phone and a watch, a service type of a target service is a real-time notification service, and the method includes the following steps.

Step 501: A user opens a car-hailing application on a mobile phone for car hailing.

Step 502: The mobile phone sends a car-hailing request of the user to an application server corresponding to the car-hailing application.

Step 503: After receiving a user request, the application server sends car-hailing service data (whether a car-hailing service succeeds, a departure place, a destination, driver information, and the like) to a service distribution system.

Step 504: The service distribution system sends the car-hailing service data to the mobile phone.

Step 505: The mobile phone presents the car-hailing service data to the user.

Step 506: After walking to a pick-up spot, the user raises an arm to observe a watch.

Step 507: After detecting an arm-raising action of the user, the service distribution system dispatches the car-hailing service data to the watch.

Step 508: The watch presents the car-hailing service data to the user.

In this embodiment of the present invention, service data requested by the user is first sent to the service distribution system, and the service distribution system determines an optimal result based on a current device status and user behavior, and then dispatches the data to an optimal device for display, to achieve an effect of intelligently displaying a service. Different from implementation in the conventional technology, car-hailing service information is intelligently displayed on the watch. In the conventional technology, data can only be pushed to a device requesting the service, that is, only the mobile phone can query the requested car-hailing service data, but another device such as the watch cannot present the requested car-hailing service data. However, in this embodiment of the present invention, the service requested by the user can be presented to the user by a proper device at an appropriate time.

The foregoing mainly describes the solutions of the embodiments of the present invention from a perspective of the method procedure. It may be understood that, to implement the foregoing functions, each network element such as a service distribution system includes a corresponding hardware structure and/or software module for executing each function. A person skilled in the art should be easily aware that units and algorithm steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the service distribution system or the like may be divided into function modules based on the foregoing method example. For example, each function module may be obtained through division based on a corresponding function, or two or more functions may be integrated into one processing module. The integrated module may be implemented in a form of hardware, or may be implemented in a form of a software function module. It should be noted that in the embodiments of the present invention, division into the modules is an example and is merely logical function division, and may be other division in an actual implementation.

Figure 6:
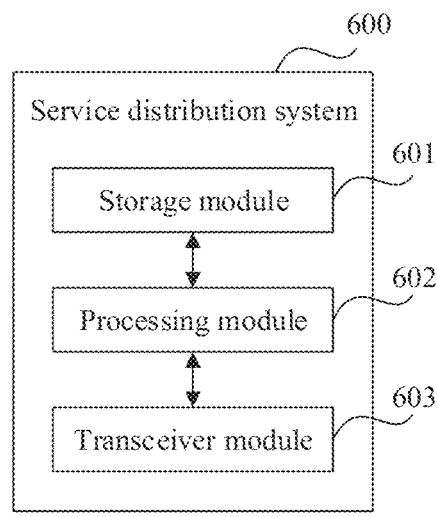
FIG. 6 is a schematic structural diagram of another service distribution system according to an embodiment of the present invention.

When an integrated module is used, FIG. 6 is a possible schematic structural diagram of the service distribution system in the foregoing embodiment. A service distribution system 600 includes a processing module 602 and a transceiver module 603. The processing module 602 is configured to control and manage an action of the service distribution system. For example, the processing module 602 is configured to support the service distribution system in performing the processes in FIG. 2, FIG. 4, and FIG. 5, and/or is configured to perform another process of the technology described in this specification. The transceiver module 603 is configured to support communication between the service distribution system and another network entity, for example, communication with an application server or a terminal device. The service distribution system may further include a storage module 601, configured to store program code and data of the service distribution system.

The transceiver module 603 is configured to: obtain service data generated after a target service is triggered, where the service data includes service type information and user information; and obtain, in a determining period of the target service, device capability information and device status information of a plurality of terminal devices associated with the user information.

The processing module 602 is configured to determine, based on the service type information, and the device capability information and the device status information of the plurality of terminal devices that are obtained by the transceiver module 603, a target terminal device that is in the plurality of terminal devices and that is used to execute the target service and/or a target moment for executing the target service.

Optionally, in an embodiment, the service data obtained by the transceiver module 603 further includes application information of an application that provides the target service.

That the processing module 602 is configured to determine, based on the service type information, and the device capability information and the device status information of the plurality of terminal devices, a target terminal device that is in the plurality of terminal devices and that is used to execute the target service and/or a target moment for executing the target service includes:

the processing module 602 obtains, based on the application information, a rule file matching the application information; and the processing module 602 determines, based on the service type information, and the device capability information and the device status information of the plurality of terminal devices and by using the rule file and/or a decision model pre-trained by using the rule file, the target terminal device that is in the plurality of terminal devices and that is used to execute the target service and/or the target moment for executing the target service.

Optionally, in an embodiment, a service type indicated by the service type information obtained by the transceiver module 603 includes any one of the following types:

a life service of a user, a service triggered in a scheduled manner, a real-time notification service, and a communication service.

Optionally, in an embodiment, a device capability indicated by the device capability information obtained by the transceiver module 603 includes at least one of the following capabilities:

an audio output capability, a video output capability, and a communication capability.

Optionally, in an embodiment, a device status indicated by the device status information obtained by the transceiver module 603 includes at least one of the following statuses:

an on or off state, a geographical location state, and a motion state.

Further, the decision model used by the processing module 602 is a machine learning model established based on a random forest algorithm, and a random forest in the random forest algorithm includes a plurality of decision trees.

Optionally, in an embodiment, a service type indicated by the service type information obtained by the transceiver module 603 is a service triggered in a scheduled manner.

The plurality of terminal devices include a television and a mobile phone;

an on or off state of the television indicates that the television is in an on state; and a geographical location state of the mobile phone indicates that the mobile phone is at home.

That the processing module 602 is configured to determine, based on the service type information, and the device capability information and the device status information of the plurality of terminal devices, a target terminal device that is in the plurality of terminal devices and that is used to execute the target service and/or a target moment for executing the target service includes:

the processing module 602 determines, based on the case in which a service type is a service triggered in a scheduled manner, the television is in an on state, and the mobile phone is at home, that the target terminal device that is in the plurality of terminal devices and that is used to execute the target service is the television.

Optionally, in an embodiment, a service type indicated by the service type information obtained by the transceiver module 603 is a real-time notification service.

The plurality of terminal devices include a mobile phone and a watch;

a motion state of the watch indicates a user to raise an arm to observe the watch; and a geographical location state of the mobile phone indicates that the mobile phone is at a waiting location of the target service.

That the processing module 602 is configured to determine, based on the service type information, and the device capability information and the device status information of the plurality of terminal devices, a target terminal device that is in the plurality of terminal devices and that is used to execute the target service and/or a target moment for executing the target service includes:

the processing module 602 determines, based on the case in which a service type is a real-time notification service, a motion state of the watch indicates a user to raise an arm to observe the watch, and a geographical location state of the mobile phone indicates that the mobile phone is at a waiting location of the target service, that the target terminal device that is in the plurality of terminal devices and that is used to execute the target service is the watch.

Optionally, in an embodiment, a service type indicated by the service type information obtained by the transceiver module 603 is a real-time notification service.

The plurality of terminal devices include a mobile phone and a watch;

a motion state of the watch indicates a user to raise an arm to observe the watch; and a geographical location state of the mobile phone indicates that the mobile phone is at a waiting location of the target service.

That the processing module 602 is configured to determine, based on the service type information, and the device capability information and the device status information of the plurality of terminal devices, a target terminal device that is in the plurality of terminal devices and that is used to execute the target service and/or a target moment for executing the target service includes:

the processing module 602 determines, based on the case in which a service type is a real-time notification service, a motion state of the watch indicates a user to raise an arm to observe the watch, and a geographical location state of the mobile phone indicates that the mobile phone is at a waiting location of the target service, to execute the target service at a current moment.

In this embodiment of the present invention, the transceiver module 603 first obtains the service data generated after the target service is triggered, where the service data includes the service type information and the user information, and obtains, in the determining period of the target service, the device capability information and the device status information of the plurality of terminal devices associated with the user information, and then the processing module 602 determines, based on the service type information, and the device capability information and the device status information of the plurality of terminal devices, the target terminal device that is in the plurality of terminal devices and that is used to execute the target service and/or the target moment for executing the target service. It may be learned from the above that, the service distribution system performs unified scheduling management on a service, and determines, based on a service context of the target service and device contexts of the plurality of terminal devices associated with a user of the target service, the target terminal device that is in the plurality of terminal devices and that is used to execute the target service and/or the target moment for executing the target service. In this way, an execution device and an execution occasion of the target service are both flexible and changeable, thereby implementing service transfer among multiple terminal devices.

The processing module 602 may be a processor or a controller, for example, may be a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field Programmable Gate Array, FPGA) or another programmable logical device, a transistor logical device, a hardware component, or any combination thereof. The processing module 602 may implement or execute various example logical blocks, modules, and circuits described with reference to content disclosed in the embodiments of the present invention. The processor may be a combination of processors implementing a computing function, for example, a combination of one or more microprocessors, or a combination of a DSP and a microprocessor. The transceiver module 603 may be a communications interface, a transceiver, a transceiver circuit, or the like. The communications interface is a general term and may include one or more interfaces. The storage module 601 may be a memory.

Figure 7:
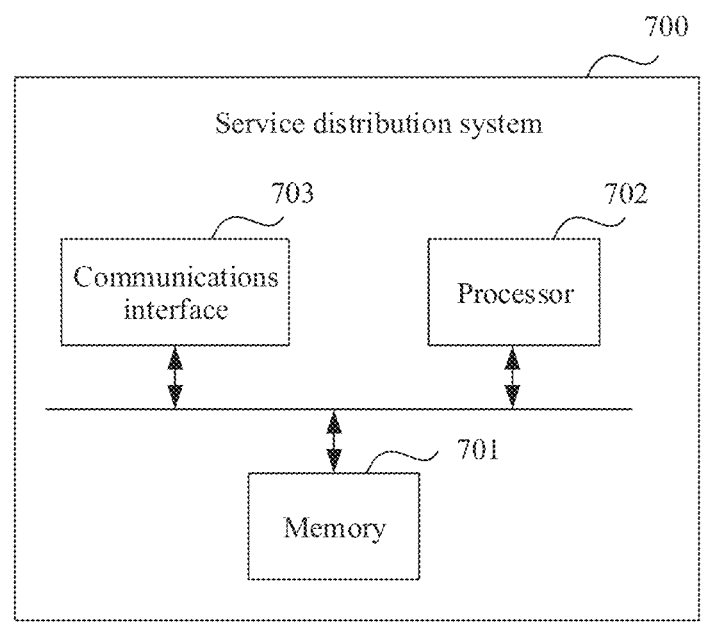
FIG. 7 is a schematic structural diagram of another service distribution system according to an embodiment of the present invention.

When the processing module 602 is a processor, the transceiver module 603 is a communications interface, and the storage module 601 is a memory, the service distribution system in this embodiment of the present invention may be a service distribution system shown in FIG. 7.

Referring to FIG. 7, a service distribution system 700 includes a processor 702, a communications interface 703, and a memory 701. The communications interface 703, the processor 702, and the memory 701 may be connected to each other through a communication connection.

Figure 8:
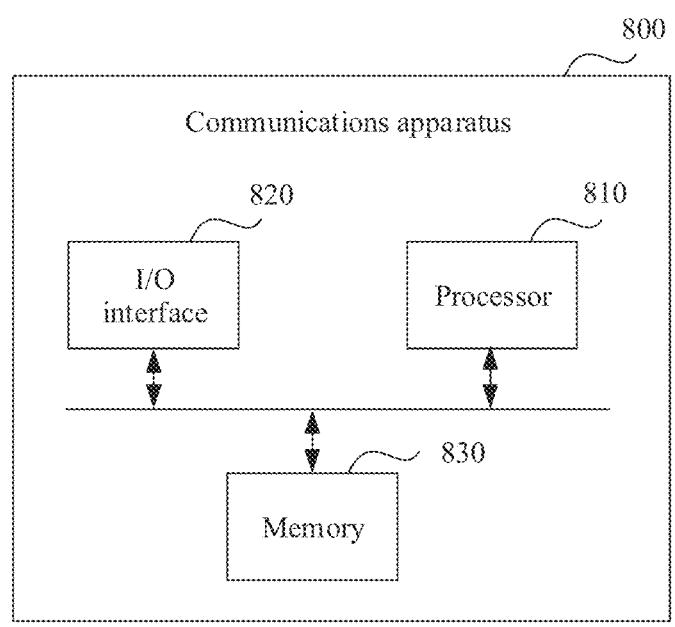
FIG. 8 is a schematic diagram of a communications apparatus according to an embodiment of the present invention.

FIG. 8 is a schematic diagram of a communications apparatus according to an embodiment of this application. As shown in FIG. 8, a communications apparatus 800 may be a chip, and the chip includes a processing unit and a communications unit. The processing unit may be a processor 810, and the processor may be various types of processors described above. The communications unit may be, for example, an input/output interface 820, a pin, or a circuit, and the communications unit may include a system bus or may be connected to a system bus. Optionally, the communications apparatus further includes a storage unit. The storage unit may be a memory 830 inside the chip, for example, a register, a cache, a random access memory (random access memory, RAM), an EEPROM, or a flash. The storage unit may be alternatively a memory outside the chip, and the memory may be various types of memories described above. The processor is connected to the memory, and the processor may run instructions stored in the memory, so that the communications apparatus performs the methods shown in FIG. 2, FIG. 4, and FIG. 5.

All or some of the foregoing embodiments of the present invention may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method comprising:
    obtaining service data associated with a target service that has been triggered, wherein the service data comprises application information of an application that provides the target service, service type information, and user information;
    obtaining, based on the application information, a rule file matching the application information;
    obtaining, during a determining period of the target service, device capability information and device status information of a plurality of terminal devices associated with the user information; and
    determining, based on the service type information, the device capability information, and the device status information and using either the rule file or a decision model pre-trained using the rule file, a target terminal device in the terminal devices that executes the target service or a target moment for executing the target service.

2. The method of claim 1, wherein a service type indicated by the service type information comprises:
    a life service of a user;
    a service triggered in a scheduled manner;
    a real-time notification service; or
    a communication service.

3. The method of claim 1, wherein a device capability indicated by the device capability information comprises:
    an audio output capability;
    a video output capability; or
    a communication capability.

4. The method of claim 1, wherein a device status indicated by the device status information comprises:
- an on state or an off state;
- a geographical location state; or
- a motion state.

5. The method of claim 1, wherein the decision model is a machine learning model based on a random forest algorithm, and wherein a random forest in the random forest algorithm comprises a plurality of decision trees.

6. The method of claim 1, wherein a service type indicated by the service type information is a service triggered in a scheduled manner, wherein the terminal devices comprise a television and a mobile phone, wherein an on state or an off state of the television indicates that the television is in the on state, wherein a geographical location state of the mobile phone indicates that the mobile phone is at home, and wherein the method further comprises determining, based on the service triggered in the scheduled manner, the television is in the on state, and the mobile phone is at the home, that the target terminal device is the television.

7. The method of claim 1, wherein a service type indicated by the service type information is a real-time notification service, wherein the terminal devices comprise a mobile phone and a watch, wherein a motion state of the watch indicates a user to raise an arm to observe the watch, wherein a geographical location state of the mobile phone indicates that the mobile phone is at a waiting location of the target service, and wherein the method further comprises determining, based on the real-time notification service, the motion state, and the geographical location state, that the target terminal device is the watch.

8. The method of claim 1, wherein a service type indicated by the service type information is a real-time notification service, wherein the terminal devices comprise a mobile phone and a watch, wherein a motion state of the watch indicates a user to raise an arm to observe the watch, wherein a geographical location state of the mobile phone indicates that the mobile phone is at a waiting location of the target service, and wherein the method further comprises determining, based on the real-time notification service, the motion state, and the geographical location state, to execute the target service at the target moment.

9. A service distribution system comprising:
- a transceiver configured to:
  - obtain service data associated with a target service that has been triggered, wherein the service data comprises application information of an application that provides the target service, service type information and user information;
  - obtain, based on the application information, a rule file matching the application information; and
  - obtain, during a determining period of the target service, device capability information and device status information of a plurality of terminal devices associated with the user information; and
- a processor coupled to the transceiver and configured to determine, based on the service type information, the device capability information, and the device status information and using either the rule file or a decision model pre-trained using the rule file, a target terminal device in the terminal devices that executes the target service or a target moment for executing the target service.

10. The service distribution system of claim 9, wherein a service type indicated by the service type information comprises:
- a life service of a user;
- a service triggered in a scheduled manner;
- a real-time notification service; or
- a communication service.

11. The service distribution system of claim 9, wherein a device capability indicated by the device capability information comprises:
- an audio output capability;
- a video output capability; or
- a communication capability.

12. The service distribution system of claim 9, wherein a device status indicated by the device status information comprises:
- an on state or an off state;
- a geographical location state; or
- a motion state.

13. The service distribution system of claim 9, wherein the decision model is a machine learning model established based on a random forest algorithm, and wherein a random forest in the random forest algorithm comprises a plurality of decision trees.

14. The service distribution system of claim 9, wherein a service type indicated by the service type information is a service triggered in a scheduled manner, wherein the terminal devices comprise a television and a mobile phone, wherein an on state or off state of the television indicates that the television is in the on state, wherein a geographical location state of the mobile phone indicates that the mobile phone is at home, and wherein the processor is further configured to determine, based on the service triggered in the scheduled manner, the television is in the on state, and the mobile phone is at the home, that the target terminal device is the television.

15. The service distribution system of claim 9, wherein a service type indicated by the service type information is a real-time notification service, wherein the terminal devices comprise a mobile phone and a watch, wherein a motion state of the watch indicates a user to raise an arm to observe the watch, wherein a geographical location state of the mobile phone indicates that the mobile phone is at a waiting location of the target service, and wherein the processor is further configured to determine, based on the real-time notification service, the motion state, and the geographical location state, that the target terminal device is the watch.

16. The service distribution system of claim 9, wherein a service type indicated by the service type information is a real-time notification service, wherein the terminal devices comprise a mobile phone and a watch, wherein a motion state of the watch indicates a user to raise an arm to observe the watch, wherein a geographical location state of the mobile phone indicates that the mobile phone is at a waiting location of the target service, and wherein the processor is further configured to determine, based on the real-time notification service, the motion state, and the geographical location state, to execute the target service at the target moment.

17. A computer program product comprising computer-executable instructions stored on a non-transitory computer-readable medium that, when executed by a processor, cause an apparatus to:
- obtain service data associated with a target service that has been triggered, wherein the service data comprises application information of an application that provides the target service, service type information, and user information;

obtain, based on the application information, a rule file matching the application information;

obtain, during a determining period of the target service, device status information and device capability information of a plurality of terminal devices associated with the user information; and determine, based on the service type information, the device capability information, and the device status information and using either the rule file or a decision model pre-trained using the rule file, a target terminal device in the terminal devices that executes the target service or a target moment for executing the target service.

18. The computer program product of claim 17, wherein a service type indicated by the service type information comprises:

a life service of a user;
a service triggered in a scheduled manner;
a real-time notification service; or
a communication service.

19. The computer program product of claim 17, wherein a device capability indicated by the device capability information comprises:

an audio output capability;
a video output capability; or
a communication capability.

* * * * *